US006442667B1

(12) United States Patent
Shiell et al.

(10) Patent No.: US 6,442,667 B1
(45) Date of Patent: Aug. 27, 2002

(54) SELECTIVELY POWERING X Y ORGANIZED MEMORY BANKS

(75) Inventors: Jonathan H. Shiell, Plano; Donald E. Steiss, Richardson, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/314,557

(22) Filed: May 19, 1999

Related U.S. Application Data

(60) Provisional application No. 60/088,450, filed on Jun. 8, 1998.

(51) Int. Cl.$^7$ .............................................. G06F 12/00
(52) U.S. Cl. .......................... 711/207; 711/205; 711/5; 365/230.03
(58) Field of Search ........................... 711/5, 114, 157, 711/205, 207; 365/230.03

(56) References Cited

U.S. PATENT DOCUMENTS

| | | | | |
|---|---|---|---|---|
| 4,525,778 A | * | 6/1985 | Cane | 711/207 |
| 5,301,292 A | | 4/1994 | Hilton et al. | 711/157 |
| 5,442,588 A | * | 8/1995 | Runas | 365/222 |
| 5,559,986 A | | 9/1996 | Alpert et al. | 711/144 |
| 5,564,052 A | * | 10/1996 | Nguyen et al. | 365/49 |
| 5,687,114 A | * | 11/1997 | Khan | 365/185.03 |
| 6,049,672 A | * | 4/2000 | Shiell et al. | 395/712 |
| 6,069,834 A | * | 5/2000 | Watanabe et al. | 365/230.03 |

FOREIGN PATENT DOCUMENTS

WO WO 93/13481 7/1993

OTHER PUBLICATIONS

OPTI Data Sheet 82C802G–0.1, pp. 19–22.

\* cited by examiner

*Primary Examiner*—Matthew Kim
*Assistant Examiner*—Matthew D. Anderson
(74) *Attorney, Agent, or Firm*—Robert D. Marshall, Jr.; W. James Brady, III; Frederick J. Telecky, Jr.

(57) ABSTRACT

This invention is memory system including plural memory banks logically disposed into an array of X rows and Y columns. A first decoder selectively powers one of the Y columns corresponding to a first predetermined set of address bits. A second decoder selectively powers one of the X rows corresponding to a second predetermined set of address bits. Multiplexers select the powered memory bank for data access. Thus one of the plural memory banks is powered and selected for memory access corresponding to the first and second predetermined sets of bits of the received address. This memory system is preferably a cache memory including a further column of memory banks for cache addresses and cache control data including at least a cache valid tag. A multiplexer selects one row corresponding to the second predetermined set of address bits. A valid and equal unit indicates whether data received from the third multiplexer includes a cache valid tag indicating a valid address and a cache address matching the received address. This indicates a cache hit.

1 Claim, 4 Drawing Sheets

US 6,442,667 B1

SELECTIVELY POWERING X Y ORGANIZED MEMORY BANKS

This application claims priority under 35 USC §119(e)(1) of Provisional Application No. 60/088,450, filed Jun. 8, 1998.

TECHNICAL FIELD OF THE INVENTION

The technical field of this invention is low power computer memory and particularly selectively powered cache memory.

BACKGROUND OF THE INVENTION

The microprocessors used in current personal computers operate upon data at very high speeds. This is particularly true for superscalar microprocessors that can operate on more than one instruction at a time. It is not economically feasible to construct the entire computer memory system to operate at the same rate as the microprocessor. Further, it is not necessary to construct such a memory system. Microprocessors employ data or instruction caches based upon an assumption of locality. Having once referenced particular data or a particular instruction from main memory, it is normally the case that nearby data or instructions will be referenced again in the near future. It is feasible to construct a small and fast memory to temporarily store such data or instructions. This small fast memory is called a cache. It is typical to recall data from the main memory in minimum sizes larger than the minimum addressable memory size. Such memory recalls may be via a data bus wider than the minimum addressable data size or via bursts of plural memory accesses or both. Such recall of adjacent data also serves the locality assumption by recalling from nearby addresses that are likely to be referenced in the near future. Memory caches store their data with an indication of the corresponding main memory address.

Each memory reference by the microprocessor is tested against these cache address indications to determine if the referenced address is cached. If the referenced address is stored in the cache, called a cache hit, then the memory access takes place within the cache rather than the main memory. Since memory access to the cache is faster than access to the main memory, each cache hit represents a gain in memory access speed. Note that such memory accesses may be made for both reads of the memory and writes to the memory. If the referenced address is not stored in the cache, called a cache miss, then the main memory must be accessed. In a read access, the microprocessor operation unit needing the data must stall until the data is returned from the slower main memory. When recalled, this main memory data is both supplied to the requesting microprocessor operation unit and stored in the cache.

With the need for larger cache memories that operate a higher speeds, power consumption becomes a problem. In CMOS circuits the electric power consumed is directly proportional to both the operational speed and the number of circuits. Accordingly, there is a need in the art for additional techniques for reducing electrical power consumption of cache memories.

SUMMARY OF THE INVENTION

This invention is memory system including plural memory banks. The memory banks are logically disposed into an array of X rows and Y columns. A first decoder selectively powers one of the Y columns corresponding to a first predetermined set of address bits. A second decoder selectively powers one of the X rows corresponding to a second predetermined set of address bits. A first plurality of multiplexers connected to the data busses of memory banks of a corresponding column selects the data bus of said selected row. A second multiplexer connected to each of the first multiplexers selects one of the columns. Thus one of the plural memory banks is powered and selected for memory access corresponding to the first and second predetermined sets of bits of the received address.

This memory system is preferably a cache memory. The cache memory also includes a further column of X rows of memory banks storing cache addresses and cache control data including at least a cache valid tag. A third multiplexer connected to the data busses of the further column selects one row corresponding to the second predetermined set of address bits. A valid and equal unit indicates whether data received from the third multiplexer includes a cache valid tag indicating a valid address and a cache address matching the received address. This indicates a cache hit.

The memory system preferably includes a table look aside buffer translating a predetermined number of most significant address bits from a virtual address to a physical address. A third predetermined set of address bits including at least one translated bit and one untranslated bit addresses the selected row of the further column of memory banks. These third predetermined set of address bits are preferably translated by a micro table look aside buffer.

BRIEF DESCRIPTION OF THE DRAWINGS

These and other aspects of this invention are illustrated in the drawings, in which.

DETAILED DESCRIPTION OF PREFERRED EMBODIMENTS

This invention is a memory organization permitting selective powering only parts of the memory depending on the address accessed. Such selective powering of the memory reduces power consumption for the integrated circuit and reduces generated heat. This technique is particularly useful in microprocessors with large integrated cache memories. Advanced microprocessors operate a high speeds consuming much electric power. Due to their high speed operation, advanced microprocessors typically operate much faster than their attendant memory systems. In order to achieve the maximum potential computational speeds, such microprocessors typically include large memory caches on the same integrated circuit. Employing this invention with these integrated caches is particularly advantageous.

Figure 1:
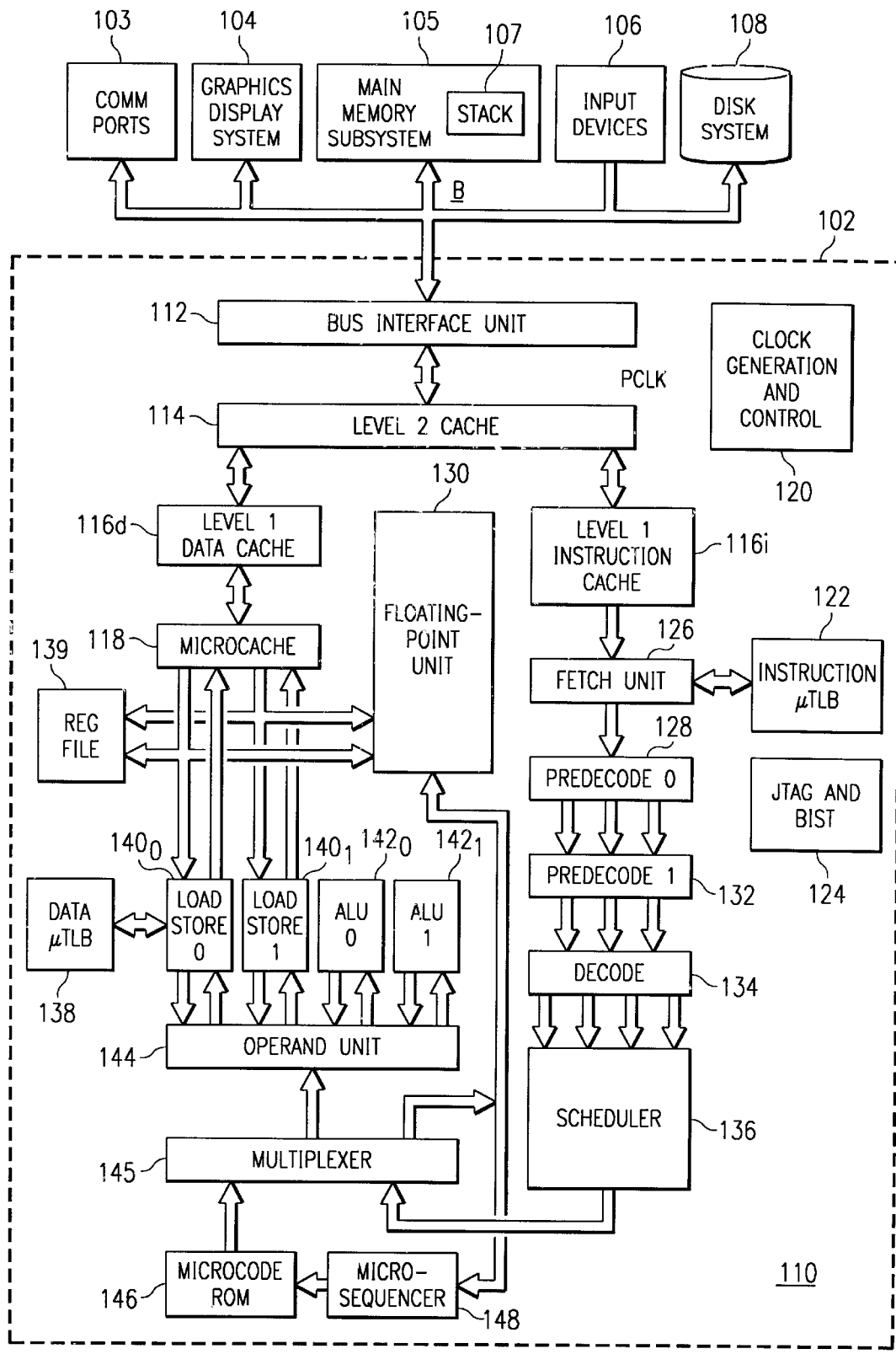
FIG. 1 illustrates in block diagram form the overall architecture of a microprocessor to which this applicable.

FIG. 1 illustrates a block diagram of a microprocessor embodiment into which the embodiments of this invention may be incorporated. Referring now to FIG. 1, an exemplary computer system 102, including an exemplary superscalar pipelined microprocessor 110 within which the preferred embodiment is implemented, will be described. It is to be understood that the architecture of computer system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 110, as shown in FIG. 1, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. Computer system 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD ROM drives). It is therefore contemplated that computer system 102 of FIG. 1 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit (BIU) 112 that is connected to bus B, and which controls and effects communication between microprocessor 110 and the other elements in computer system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 1, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around cache 114, by treating certain bus reads and writes as "not cacheable." Level 2 cache 114, as shown in FIG. 1, is connected to two level 1 caches 116; level 1 data cache $116_d$ is dedicated to data, while level 1 instruction cache $116_i$ is dedicated to instructions. Power consumption by microprocessor 110 is minimized by only accessing level 2 cache 114 only in the event of cache misses of the appropriate one of the level 1 caches 116. Furthermore, on the data side, microcache 118 is provided as a level 0 cache, which in this example is a fully dual ported cache.

As shown in FIG. 1 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $144_0$, $144_2$ for processing conditional branch, integer, and logical operations, floating point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation look aside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

F Fetch: This stage generates the instruction address and reads the instruction from the instruction cache or memory PD0 Predecode stage 0: This stage determines the length and starting position of up to three fetched x86 type instructions PD1 Predecode stage 1: This stage extracts the x86 instruction bytes and recodes them into fixed length format for decode DC Decode: This stage translates the x86 instructions into atomic operations (AOps)

SC Schedule: This stage assigns up to four AOps to the appropriate execution units OP Operand: This stage retrieves the register operands indicated by the AOps EX Execute: This stage runs the execution units according to the AOps and the retrieved operands WB Write back : This stage stores the results of the execution in registers or in memory Referring back to FIG. 1, the pipeline stages noted above are performed by various functional blocks within microprocessor 110. Fetch unit 126 generates instruction addresses from the instruction pointer, by way of instruction micro-translation look aside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution, As indicated in FIG. 1, operand unit 144 receives an input from scheduler 136 and also from microcode ROM 148, via multiplexer 145, and fetches register operands for use in the execution of the instructions. In addition, according to this example, operand unit 144 performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Microprocessors such as that illustrated in FIG. 1 typically employ virtual memory. In virtual memory systems the memory access units of the microprocessor generate virtual addresses for memory access. A table look aside buffer translates the virtual address generated by the microprocessor into a physical address needed to physical memory. This table look aside buffer includes plural virtual address registers, each with a corresponding physical address registers. The table look aside buffer compares each received virtual address with the addresses stored in the virtual address registers. The table look aside buffer substitutes the physical address bits stored in the physical address register corresponding to the virtual address register matching the received virtual address. It is known in the art to substitute only the most significant address bits. Thus a set of least significant address bits is the same for both the virtual address and the corresponding physical address. The amount of data accessed by the number of such untranslated address bits is called the page size. The untranslated address bits themselves are sometimes called the page offset, indicating the offset from the beginning of the page. The virtual address registers and the physical address registers may be altered under control of the microprocessor. Thus the microprocessor can map or relocate any page of physical memory to a convenient part of virtual memory.

Figure 2:
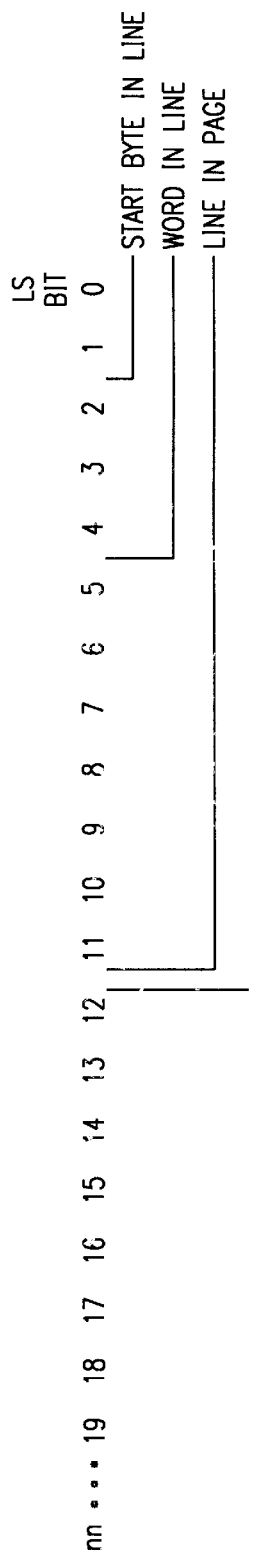
FIG. 2 illustrates an example of the use of address bits according to the prior art.

FIG. 2 illustrates the portions of an address such as may be used by the microprocessor 100 of FIG. 1 in the prior art. This address typically includes 32 bits, however the most significant bits are not illustrated to save space. In accordance with the x86 architecture of microprocessor 100, each address location stores 8 bits or one byte of data. Thus each individual address points to a byte of data. The example of FIG. 2 employs a 4 kilobyte page. Address bits 0 to 11 serve as the page offset bits and are the same for both the virtual address and the physical address. In this example, each cache word includes four bytes of data selected by address bits 0 and 1. Each cache line includes eight words of data selected by address bits 2 to 4. The cache includes 128 cache lines of data selected by address bits 5 to 11. This employs all the page offset bits. The higher order address bits 12 to 31 are translated by a table look aside buffer from the virtual address supplied by one of the load/store units $40_0$ or $40_1$ to the physical address needed to access physical memory. This system permits the table look aside buffer to relocate pages of 4 kilobytes of data to any convenient location within the virtual memory map.

Figure 3:
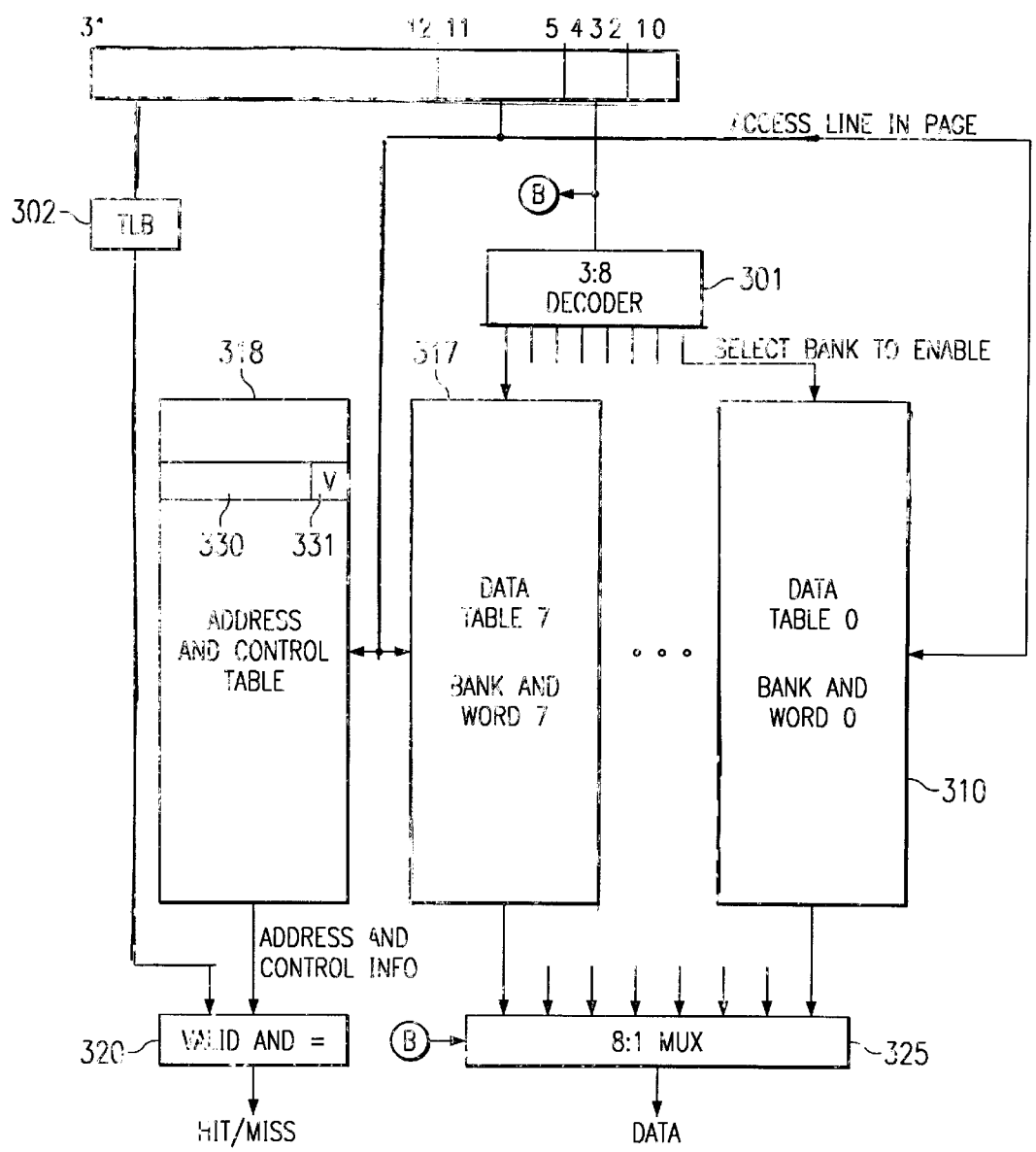
FIG. 3 illustrates a prior art cache system using the address bits a set forth in FIG. 2.

The use of these address bits in accessing the cache memory is illustrated in FIG. 3. FIG. 3 illustrates a 4 kilobyte bank interleaved direct mapped cache as known in the art. Address bits 2 to 4 of the address are supplied to 3 to 8 decoder 301. The 3 to 8 decoder 301 selects one of the eight cache banks 310 to 317 (only cache banks 310 and 317 are illustrated for brevity) to power for the cache access based upon the state of address bits 2 to 4. This advantageously enables only one of the eight cache memory banks to be powered for each data access. Note that this block selection is made from the address bits that are identical for the virtual and physical address. Thus these address bits are available as soon as the address is generated by one of the load/store units $40_0$ or $40_1$. Accordingly, this selection of which memory bank to power can take place during the address translation of table look aside buffer 302. Note that address and control table bank 318 is powered for every cache access. As known in the art, each entry 330 in address and control table bank 318 includes a valid bit 331 indicating whether a corresponding cache line within memory banks 310 to 317 stores valid data. Line selection address bits 5 to 11 select a particular line within each bank 310 to 317.

Valid and equal unit 320 determines if the selected line is valid by reading a corresponding line valid bit from address and control table 318 selected by address bits 5 to 11. Valid and equal unit 320 receives the translated physical address from table look aside buffer 302. Valid and equal unit 320 produces an output signal indicating whether both the selected cache line is valid and the cache line memory address matches the translated address from table look aside buffer 302. Such a match is a cache hit. This indicates that the data in the selected column corresponds to the data desired to be accessed. Failure to detect both a valid indication and a match to the translated physical address is a cache miss. This indicates that the desired data to be access is not stored in the cache.

Note that each of memory banks 310 to 317 have a corresponding data bus for memory access. These data busses are connected to eight to one multiplexer 325. Eight to one multiplexer 325 receives address bits 2 to 8 as a control input. Eight to one multiplexer 325 selects for data access the same memory bank 310 to 317 selected for powering by three to eight decoder 301. Note that the flow arrows illustrated in FIG. 3 indicate movement of data out of memory banks 310 to 317 corresponding to a memory read. Those skilled in the art would realize that these same data paths could be used in reverse direction to supply data to memory banks for a memory write.

Because the selective powering of three to eight decoder 301 and the selection of multiplexer 325 are controlled by real address bits that are identical for the virtual and physical address, these selections can take place before the entire physical address is available from table look aside buffer 302. Thus valid and equal unit 320 receive the address and control bits no later than the translated physical address. Thus the cache hit/cache miss detection can be made almost as soon as the physical address is formed by table look aside buffer 302. Additionally, if a cache hit is found, the memory is ready for access because the control signal for eight to one multiplexer is already available.

As the need for microprocessors have advanced they have needed larger and larger caches for optimal operation while needing to minimize power consumption. Extending the prior art such as illustrated in FIG. 3 has problems. Conventionally there are three approaches to this problem. First, is to use some virtual address bits for selection of the part of the memory to be powered. This creates a problem with address aliasing. Second, is to wait for the complete translation of the virtual address to the physical address in table look aside buffer 302. This technique slows the whole cache memory access by increasing the time in a critical path of the cache access. Third, the set associativity of cache memory may be increased by providing plural parallel memory bank systems such as illustrated in FIG. 3.

Figure 4:
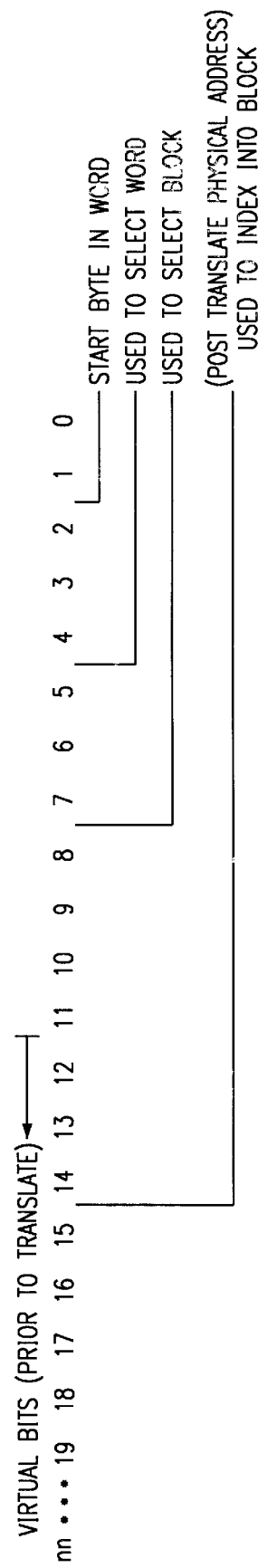
FIG. 4 illustrates the use of address bits according to an exemplary embodiment of this invention.

This invention provides an additional solution to this problem. This invention is suitable for use in the level 2 cache 14 illustrated in FIG. 1. FIG. 4 illustrates the use of the least significant address bits in a fashion similar to FIG. 2. In this embodiment as in the example of FIG. 2, each cache word includes four bytes of data selected by address bits 0 and 1 and each cache line includes eight words of data selected by address bits 2 to 4. The cache includes eight Y memory blocks selected by address bits 5 to 7. Some of the physical address bit (bits 8 to 11) and a few of the least significant translated physical address bits (bits 12 to 14) are used to select a particular row of the Y memory blocks.

Figure 5:
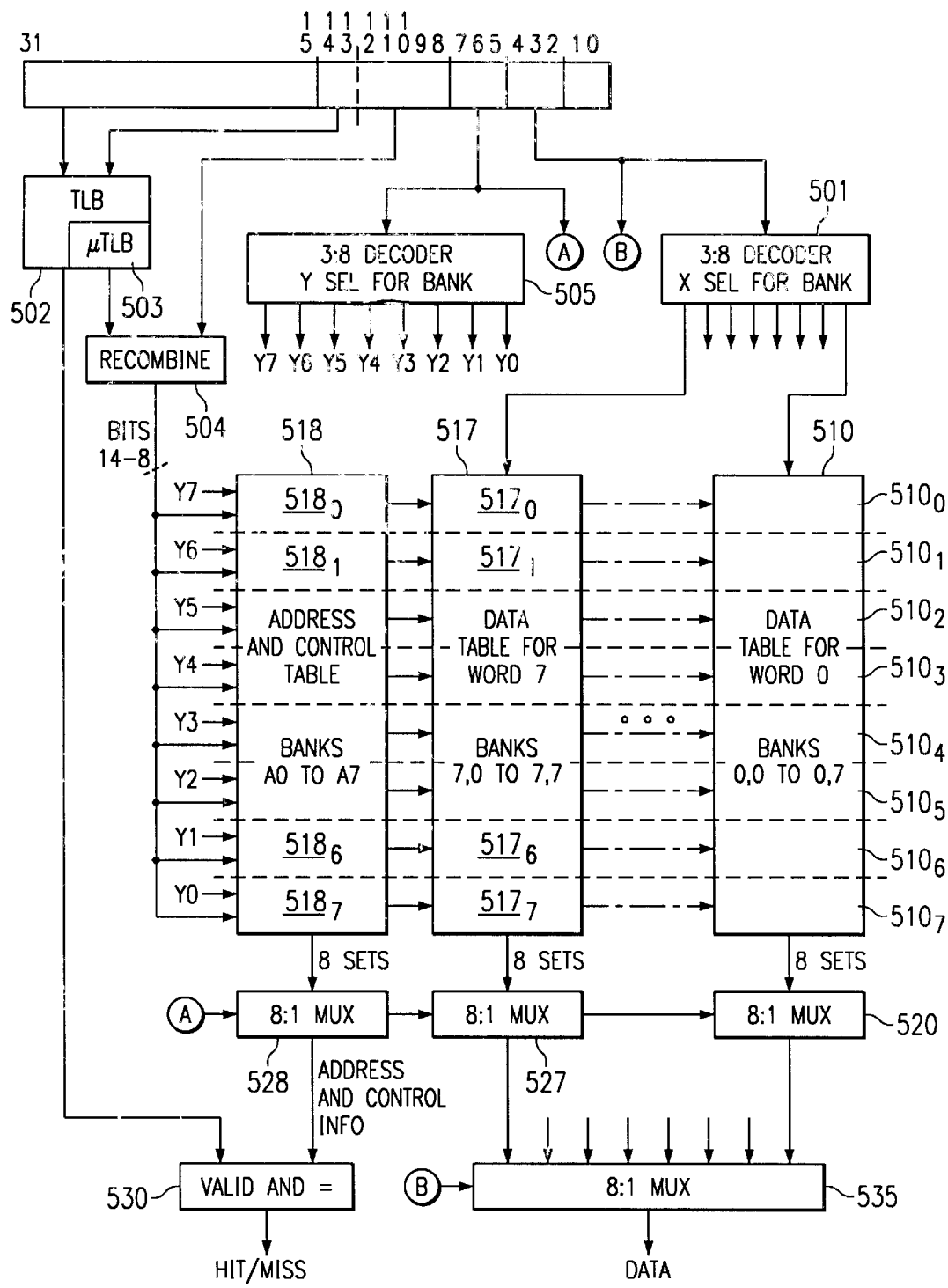
FIG. 5 illustrates an exemplary embodiment of a cache system of this invention using the address bits a set forth in FIG. 4.

FIG. 5 illustrates the use of these address bits in accessing the cache memory. FIG. 5 is similar to FIG. 3 and except that FIG. 5 illustrates a 32 kilobyte bank interleaved direct mapped cache. Address bits 2 to 4 of the address are supplied to 3 to 8 decoder 501. The 3 to 8 decoder 501 selects one of the eight cache banks 510 to 517 (only cache banks 510 and 517 are illustrated for brevity) to power for the cache access based upon the state of address bits 2 to 4. This advantageously enables only one eight of the column cache memory banks to be powered for each data access. Note that memory bank 510 is divided vertically into eight banks $510_0$, $510_1$, $510_2$, $510_3$, $510_4$, $510_5$, $510_6$ and $510_7$. Similarly, memory bank 517 is divided vertically into eight banks $517_0$, $517_1$, $517_2$, $517_3$, $517_4$, $517_5$, $517_6$ and $517_7$. Likewise, each of the other memory banks 511 to 516 are similarly divided vertically into eight parts. Address bits 5 to 7 are supplied to three to eight decoder 505. The three to eight decoder 505 selects one of the eight cache rows 0 to 7 within the cache columns 510 to 517 to power for the cache access based upon the state of address bits 5 to 7. This advantageously enables only one of the eight column cache memory banks and only one of the eight row cache memory banks to be powered for each data access. Thus only one in 64 parts of the memory is powered for data access.

As previously described, address and control table bank 518 is powered for every cache access. However, address bits 5 to 7 enable via three to eight decoder 505 only one of the rows $518_0$, $518_1$, $518_2$, $518_3$, $518_4$, $518_5$, $518_6$ and $518_7$ to be powered. Each entry within address and control table bank 518 includes a valid bit as previously described in conjunction with FIG. 3. The cache memory system includes 9 eight to one multiplexers 520 to 528. Each of the eight to one multiplexers 520 to 527 is connected to eight data busses for the corresponding column memory bank 510 to 517. Each of the rows of these columns connects a data bus to the corresponding eight to one multiplexer 520 to 528. Each of the eight to one multiplexer 520 to 528 receives address bits 5 to 7, which controls the selected data bus corresponding to the row selected for powering by three to eight decoder 505.

Note that each of the memory banks $510_0$, $510_1$, ... $510_7$, $511_0$, $511_1$, ... $511_7$, $512_0$, $512_1$, ... $512_7$, $513_0$, $513_1$, ... $513_7$, $514_0$, $514_1$, ... $514_7$, $515_0$, $515_1$, ... $515_7$, $516_0$, $516_1$, ... $516_7$, $517_0$, $517_1$, ... $516_7$, $518_0$, $518_1$, ... $518_7$ are 512 bytes, the same size as memory banks 310 to 318 illustrated in FIG. 3. Thus each memory bank requires 7 address bits for selection of one of 128 cache lines. In FIG. 5 these 7 address bits consist of address bits 8 to 14, see also FIG. 4. Address bits 8 to 11 are part of the address which is the same for the virtual address and the physical address. Address bits 12 to 14 are part of the address bits which must be translated from virtual address to physical address. In order to speed this process, table look aside buffer 502 includes a micro table look aside buffer (μTLB) 503 which permits faster access than the table look aside buffer 502. Table look aside buffers used in microprocessors such as illustrated in FIG. 1 typically is a memory organized look up table much the same as a memory cache. A micro table look aside buffer is a set of paired virtual and physical address registers. If the received virtual address matches contents of one of the virtual address registers in the micro table look aside buffer, then the address stored in the corresponding physical address register is output. In the preferred embodiment, this micro table look aside buffer 502 includes four entries. These four entries are capable of translating up to four pages from virtual address to physical address. If the received virtual address is within the micro table look aside buffer, then this register based table look aside buffer can provide the translated physical address faster than a memory based look aside buffer. The translated physical address bits 12 to 14 are concatenated with the unchanged physical address bits 8 to 11 in recombine unit 504. These address bits are then supplied to each memory bank for selection of the cache line in a manner known in the art. Note that if the received virtual address does not match the contents of the virtual address registers in micro table look aside buffer 503, then a table look aside miss occurs. The virtual address and the corresponding physical address are transferred from table look aside buffer 502 to micro table look aside buffer 503 and the cache access must stall for at least one cycle.

Valid and equal unit 530 receives the address and control information from address and control table 518 as selected by eight to one multiplexer 528. Valid and equal unit 530 determines if the selected line is valid by reading a corresponding line valid bit from the address and control table 518. Valid and equal unit 530 also receives the translated physical address from table look aside buffer 302. Valid and equal unit 530 produces an output signal indicating whether both the selected cache line is valid and the cache line memory address matches the translated address from table look aside buffer 502 in a manner similar to that described in conjunction with FIG. 3.

The data bus selected by the eight to one multiplexers 520 to 527 are connected to eight to one multiplexer 535. Eight to one multiplexer 535 also receives address bits 2 to 8. Eight to one multiplexer 535 selects for data access the same memory bank 510 to 517 selected for powering by three to eight decoder 501. Note that the flow arrows illustrated in FIG. 5 indicate movement of data out of memory banks 510 to 517 corresponding to a memory read. Those skilled in the art would realize that these same data paths could be used in reverse direction to supply data to memory banks for a memory write.

Valid and equal unit 530 receives the address and control information selected by eight to one multiplexer 528. Valid and equal unit 530 operates in a manner similar to valid and equal unit 320 to determine if the desired memory access is a cache hit or a cache miss.

This invention which uses some translated address bits for selection of the portion of the cache memory to power for data access, advantageously enables larger low power caches than previously possible. Thus the need for large low power caches in microprocessors can be served.

What is claimed is:

1. A memory system responsive to a received address comprising;

a plurality of memory banks, each memory bank including a plurality of memory entries at least as large in size as a minimum amount of data addressed, said memory banks disposed logically into an array of X rows and Y columns, each of said memory banks having a data bus for data transfer;

a first decoder responsive to a first predetermined set of bits of said received address selectively powering for memory access memory banks in a selected one of said Y columns corresponding to said first predetermined set of bit of said received address;

a second decoder responsive to a second predetermined set of bits of said received address disjoint from said first predetermined set of bits selectively powering for memory access memory banks in a selected one of said X rows corresponding to said second predetermined set of bit of said received address;

a first plurality of multiplexers, each having inputs receiving said data busses of memory banks of a corresponding column of memory banks and responsive to said second predetermined set of bits of said received address, each of said first multiplexers selecting at an output for memory access said data bus of said selected one of said X rows corresponding to said second predetermined set of bits of said received address;

a second multiplexer having inputs connected to respective outputs of said first plurality of multiplexers and responsive to said first predetermined set of bits of said received address, said second multiplexer selecting for memory access said selected one of said Y columns corresponding to said first predetermined set of bits of said received address;

a further column of X rows of memory banks, said each of said further column of X rows of memory banks having a data bus for data transfer, connected to said second decoder and selectively powered for memory access said selected one of said X rows, each of said further column of X rows of memory banks storing cache addresses and cache control data including at least a cache valid tag;

a third multiplexer having inputs receiving said data busses of said further column of X rows of memory banks and responsive to said second predetermined set of bits of said received address, said third multiplexer selecting at an output for memory access said data bus of said selected one of said further column of X rows of memory banks corresponding to said second predetermined set of bits of said received address;

a valid and equal unit receiving said received address and connected to said third multiplexer, said valid and equal unit indicating whether data received from said third multiplexer includes a cache valid tag indicating a valid address and a cache address matching said received address;

a table look aside buffer receiving said received address and translating a predetermined number of most significant address bits from a virtual address to a physical address;

a third predetermined set of bits of said received address including at least one of said predetermined number of most significant bits and at least one address bit not one of said predetermined number of most significant bits supplied to address said selected row of said further column of X rows of memory banks; and a micro table look aside buffer receiving said received address and translating said third predetermined set of bits of said received address from said virtual address to said physical address, said micro table look aside buffer testing to determine if any entry within said micro table look aside buffer corresponds to said received address, if an entry within said micro table look aside buffer corresponds to said received address, supplying said physical address corresponding to said received address and if no entry within said micro table look aside buffer corresponds to said received address, requesting a virtual address/physical address pair corresponding to said received address from said table look aside buffer, storing said virtual address/physical address pair in an entry within said micro table look aside buffer, and supplying said physical address corresponding to said received address;

whereby one of said plurality of memory banks is powered and selected for memory access corresponding to said first and second predetermined sets of bits of said received address.

* * * * *